United States Patent
Kobayashi et al.

(10) Patent No.: US 12,069,448 B2
(45) Date of Patent: Aug. 20, 2024

(54) FREQUENCY CHARACTERISTICS CONVERTING APPARATUS, METHOD AND PROGRAM FOR THE SAME

(71) Applicant: NIPPON TELEGRAPH AND TELEPHONE CORPORATION, Tokyo (JP)

(72) Inventors: Kazunori Kobayashi, Tokyo (JP); Shoichiro Saito, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 318 days.

(21) Appl. No.: 17/600,057

(22) PCT Filed: Mar. 23, 2020

(86) PCT No.: PCT/JP2020/012575
§ 371 (c)(1),
(2) Date: Sep. 29, 2021

(87) PCT Pub. No.: WO2020/203383
PCT Pub. Date: Oct. 8, 2020

(65) Prior Publication Data
US 2022/0191614 A1 Jun. 16, 2022

(30) Foreign Application Priority Data
Apr. 4, 2019 (JP) ................................. 2019-071876

(51) Int. Cl.
*H04R 3/02* (2006.01)
*B60Q 9/00* (2006.01)
(Continued)

(52) U.S. Cl.
CPC ................. *H04R 3/02* (2013.01); *B60Q 9/00* (2013.01); *G06F 3/165* (2013.01); *H04R 1/025* (2013.01);
(Continued)

(58) Field of Classification Search
CPC ........ H04R 2499/13; H04R 3/02; H04R 3/04; H04R 1/025; H04R 29/001; H04R 2430/01; B60Q 9/00; G06F 3/165
See application file for complete search history.

(56) References Cited

U.S. PATENT DOCUMENTS

| | | | |
|---|---|---|---|
| 7,039,197 B1 * | 5/2006 | Venkatesh | H04R 3/005 381/86 |
| 2013/0085749 A1 | 4/2013 | Watanabe | |
| 2018/0242081 A1 * | 8/2018 | Every | H04R 3/005 |

FOREIGN PATENT DOCUMENTS

| | | |
|---|---|---|
| JP | 62-257208 A | 11/1987 |
| JP | 11-55055 A | 2/1999 |

(Continued)

OTHER PUBLICATIONS

"Intelligent Microphone for Car' Technology," [online], 2018, Nippon Telegraph and Telephone Corporation, [Mar. 19, 2019], Internet.
(Continued)

*Primary Examiner* — Mark Fischer

(57) ABSTRACT

Provided are a frequency characteristics converting apparatus, a frequency characteristics converting method, and a program that make natural reproduced sound of a speaker compatible with howling prevention. In the frequency characteristics converting apparatus, a sound emitter is located at a first position on an inside of a vehicle, and in response to an increase in magnitude of noise at the first position, volume of target sound, collected by a sound collector installed at a second position, is increased when the target (Continued)

sound is emitted by the sound emitter, and a degree of signal processing that is applied to the target sound is increased.

8 Claims, 8 Drawing Sheets

(51) Int. Cl.
    *G06F 3/16*     (2006.01)
    *H04R 1/02*     (2006.01)
    *H04R 29/00*     (2006.01)

(52) U.S. Cl.
    CPC ....... *H04R 29/001* (2013.01); *H04R 2430/01* (2013.01); *H04R 2499/13* (2013.01)

(56) References Cited

FOREIGN PATENT DOCUMENTS

| | | |
|---|---|---|
| JP | 4-108207 A | 4/1999 |
| JP | 2005-161873 A | 6/2005 |
| JP | 2013-80994 A | 5/2013 |
| JP | 2018157537 A | 10/2018 |

OTHER PUBLICATIONS

"Equalizer," [online], 2018, [Mar. 19, 2019], Internet.

\* cited by examiner

FREQUENCY CHARACTERISTICS CONVERTING APPARATUS, METHOD AND PROGRAM FOR THE SAME

CROSS-REFERENCE TO RELATED APPLICATIONS

This application is a U.S. 371 Application of International Patent Application No. PCT/JP2020/012575, filed on 23 Mar. 2020, which application claims priority to and the benefit of JP Application No. 2019-071876, filed on 4 Apr. 2019, the disclosures of which are hereby incorporated herein by reference in their entireties.

TECHNICAL FIELD

The present invention relates to a sound collection and sound emission technique for smoothly making a conversation in a vehicle by using a microphone and a speaker. For example, a speaker and a microphone are installed in an automobile, and voice is emitted from a front-row seat to a rear-row seat or from the rear-row seat to the front-row seat to facilitate conversation under noise, such as during traveling.

BACKGROUND ART

A function called in-car communication or conversation assist is being installed in automobiles (cf. Non-Patent Literature 1). This facilitates conversation by collecting the voice of a person in a front seat with a microphone 91F and reproducing the voice with a speaker 92R in a rear seat (cf. FIG. 1). Furthermore, there is also a type in which the voice in the rear seat is collected by a microphone 91R and reproduced by a speaker 92F in the front seat.

In the function called in-car communication or conversation assist, a frequency characteristic of sound collected by a microphone is adjusted by an equalizer with a fixed frequency characteristic set, and the sound is emitted from a speaker (cf. Non-Patent Literature 2). An intrinsic frequency characteristic is set considering mainly two points. The first point is to correct the characteristics of the microphone and the speaker such that the reproduced sound of the speaker becomes a natural sound, thereby flattening (hereinafter also referred to as "equalizing") the total frequency characteristic. The second point is to prevent the occurrence of an oscillation phenomenon (hereinafter also referred to as "howling") caused by acoustic feedback from the speaker to the microphone.

CITATION LIST

Non-Patent Literature

Non-Patent Literature 1: "'Intelligent Microphone for Car' Technology", [online], 2018, Nippon Telegraph and Telephone Corporation, [Mar. 19, 2019], Internet <URL: http://www.ntt.co.jp/news2018/1802/pdf/180219c.pdf>
Non-Patent Literature 2: "Equalizer", [online], 2018, [Mar. 19, 2019], Internet <URL: https://www.ymm.co.jp/word/data.php?key=%E3%82%A4%E3%82%B3%E3%83%A9%E3%82%A4%E3%82%B6%E3%83%BC%EF%BC%BBequalizer%EF%BC%BD>

SUMMARY OF THE INVENTION

Technical Problem

There is no problem so long as the natural reproduced sound and the howling prevention due to the equalization of the frequency characteristics are achieved with the same frequency characteristic. However, because the acoustic feedback characteristic from the speaker to the microphone is usually not flat, a gain of a specific frequency needs to be reduced to prevent howling, and the total frequency characteristic from the microphone to the speaker cannot be made flat. Thus, the sound quality of the reproduced sound of the speaker is degraded by performing the equalization with priority given to not causing the howling, which is an absolute condition.

It is an object of the present invention to provide a frequency characteristics converting apparatus, a frequency characteristics converting method, and a program that make natural reproduced sound of a speaker compatible with howling prevention.

Means for Solving the Problem

For solving the above problem, according to an aspect of the present invention, in a frequency characteristics converting apparatus, a sound emitter is located at a first position on an inside of a vehicle, and in response to an increase in magnitude of noise at the first position, volume of target sound, collected by a sound collector installed at a second position, is increased when the target sound is emitted by the sound emitter, and a degree of signal processing that is applied to the target sound is increased.

For solving the above problem, according to another aspect of the present invention, in a frequency characteristics converting apparatus, a sound emitter is located at a first position on an inside of a vehicle, in response to an increase in magnitude of noise at a third position that is a position on the inside and a position different from the first position, volume of target sound, collected by a sound collector installed at a second position, is increased when the target sound is emitted by the sound emitter, and a degree of signal processing that is applied to the target sound is increased, and the first position and the third position are different positions.

For solving the above problem, according to another aspect of the present invention, a frequency characteristics converting apparatus includes: a noise level estimation unit that estimates magnitude of noise at a first position on an inside of a vehicle; a change setting database unit that holds N change settings each formed of a combination of a threshold value and a frequency characteristic representing a relationship between a frequency and a gain, where N is any integer of 2 or more; a change setting selection unit that selects one change setting out of the N change settings based on a magnitude relationship between an estimated value of the magnitude of the noise and the threshold value; and a changing unit that changes a frequency characteristic of a collected-sound signal, collected by a sound collector installed at a second position, based on a frequency characteristic corresponding to the selected change setting.

Effects of the Invention

According to the present invention, it is possible to realize a natural reproduced sound of a speaker while preventing howling.

DESCRIPTION OF EMBODIMENTS

Figure 1:
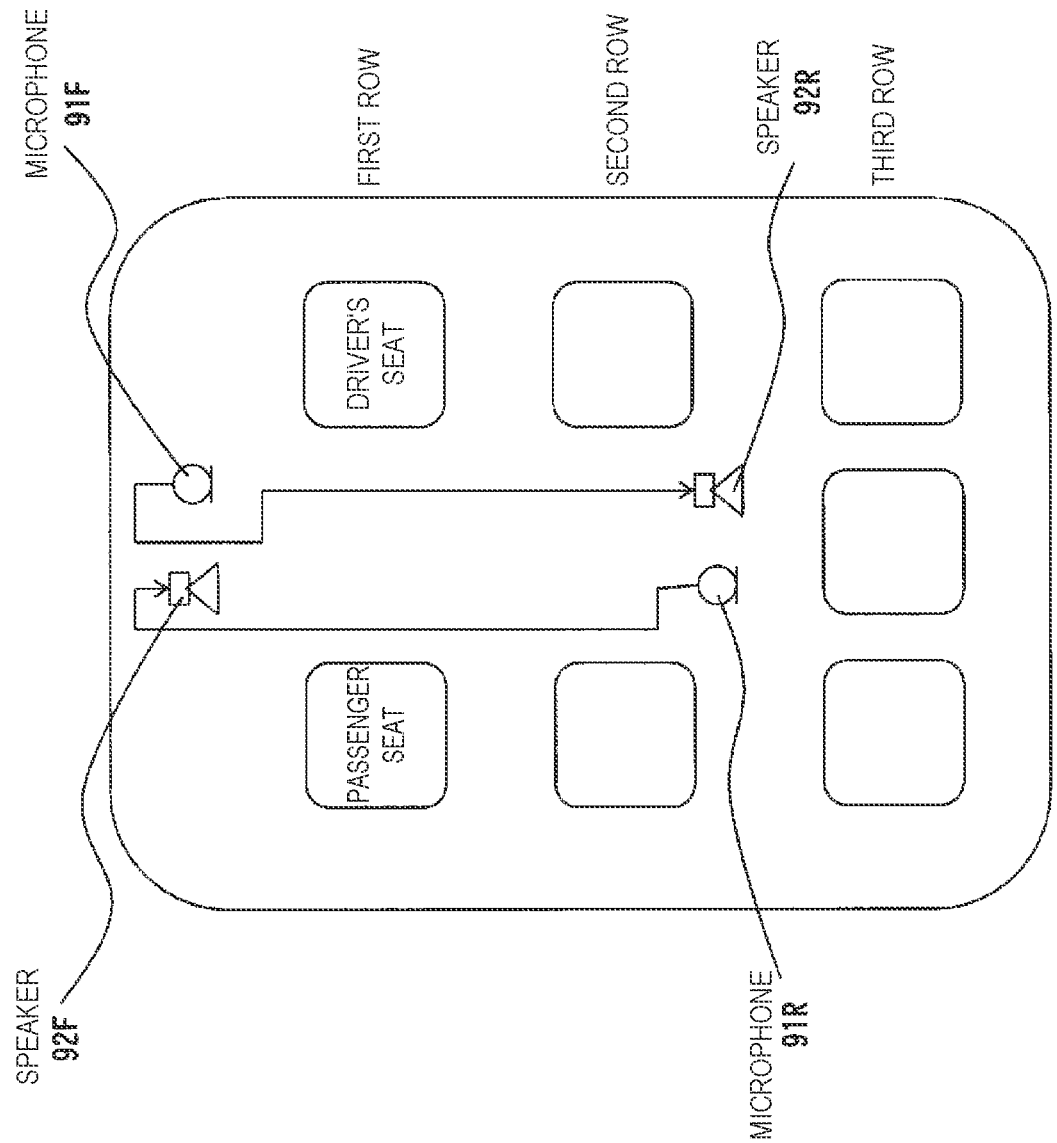
FIG. 1 is a diagram for explaining a vehicle mounted with a frequency characteristics converting apparatus according to a first embodiment.

Embodiments of the present invention will be described below. In the drawings used in the following description, component units having the same function and steps for performing the same processing are denoted by the same reference numerals, and redundant description is omitted. In the following description, processing performed by the element of a vector or a matrix is applied to all elements of the vector or the matrix, unless otherwise specified.

Points of First Embodiment

When the magnitude of noise (hereinafter also referred to as "noise level") is small at a hearing position, voice from the speaker does not need to be output at a large volume, but as the noise level increases, the volume of the speaker needs be increased because the voice becomes difficult to hear. Focusing on this point, when the noise level is small, the volume of the speaker is set to be small, and as a setting in which no howling occurs at any frequency, only the correction of the characteristics of the microphone and the speaker to be flat is performed. This sets an equalizer that brings the sound quality into the best condition. When the noise level is large, setting the volume of sound so as to be heard is more important than the sound quality, and hence the sound volume is set to be as large as possible by setting an equalizer with an emphasis on the viewpoint of howling prevention. As thus described, by changing the setting of the equalizer in accordance with the noise level at the hearing position, it is possible to set the equalizer in such a manner that the sound quality is given priority over the sound volume when the noise is small, and the sound volume is given priority over the sound quality when the noise is large. Further, the degree of signal processing on the sound collection side and the volume of sound to be emitted are determined in accordance with the noise level on the sound emission side.

Specific configurations for realizing this are as follows:

First Embodiment

Figure 2:
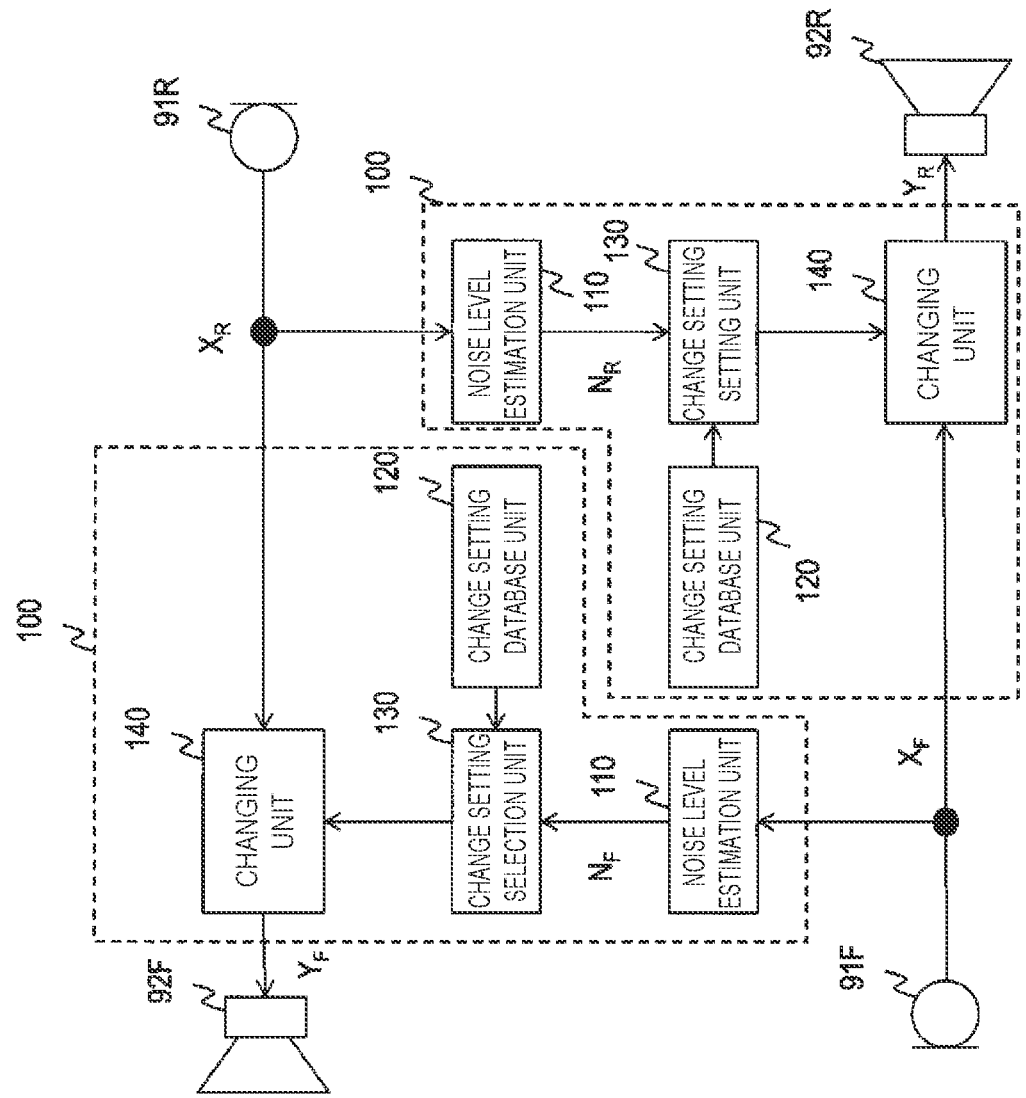
FIG. 2 is a functional block diagram of the frequency characteristics converting apparatus according to the first embodiment.
Figure 3:
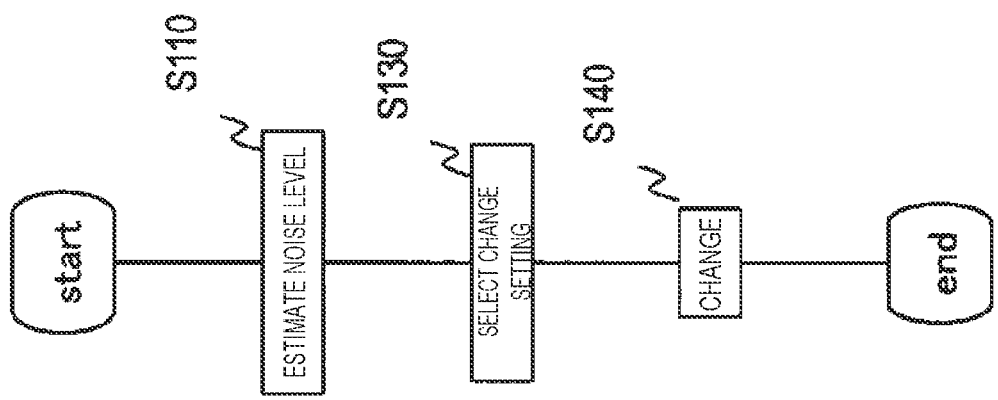
FIG. 3 is a diagram showing an example of a processing flow of the frequency characteristics converting apparatus according to the first embodiment.

FIG. 2 is a functional block diagram of a frequency characteristics converting apparatus according to a first embodiment, and FIG. 3 is a processing flow thereof.

A frequency characteristics converting apparatus 100 includes a noise level estimation unit 110, a change setting database unit 120, a change setting selection unit 130, and a changing unit 140.

The frequency characteristics converting apparatus 100 receives collected-sound signals $X_F$, $X_R$ collected by microphones 91F, 91R as inputs, changes the frequency characteristic of the collected-sound signal $X_R$, and outputs a signal (reproduced signal) $Y_F$ after the change to a speaker 92F. The frequency characteristics converting apparatus 100 may receive the collected-sound signals $X_F$, $X_R$ collected by the microphones 91F, 91R as inputs, change the frequency characteristic of the collected-sound signal $X_F$, and output a signal (reproduced signal) $Y_R$ after the change to a speaker 92R. Since the processing itself is the same except that the input/output of each unit is different, a configuration for changing the frequency characteristic of the collected-sound signal $X_R$ will be described in the present embodiment. Note that the signals $X_F$, $X_R$, $Y_F$, $Y_R$ are complex number representations of certain frequency components of the respective signals. Here, the signals $X_F$, $X_R$, $Y_F$, $Y_R$ in a frequency domain may be used as input/output as they are, signals in a time domain may be received as inputs, converted (e.g., Fourier transformed, etc.) into the signals $X_F$, $X_R$ in the frequency domain by a frequency-domain conversion unit (not shown), and used, or the signals $Y_F$, $Y_R$ in the frequency domain may be converted (e.g., inverse Fourier transformed, etc.) into signals in the time domain by a time-domain conversion unit (not shown) and output. Alternatively, a signal in the time domain may be received as an input, and a finite impulse response (FIR) filter or an Infinite impulse response (IIR) filter may be processed in the time domain, and a signal in the time domain may be output.

In the present embodiment, a vehicle mounted with the frequency characteristics converting apparatus 100 has a structure as shown in FIG. 1 and includes three rows of seats. Further, the vehicle of the present embodiment is provided with the microphone 91F that mainly collects the voice of a speaking person in the first row and the microphone 91R that mainly collects the voice of a speaking person in the third row. Each of the microphones 91F, 91R is made up of V microphones. Note that F and R are indices indicating the front and rear with respect to the traveling direction of the vehicle, respectively. Further, the vehicle of the present embodiment is provided with the speaker 92F that reproduces sound to a hearing person on the seat in the first row and the speaker 92R that reproduces sound to a hearing person on the seat in the third row. Each of the speakers 92F, 92R is made up of W speakers. W is any integer of 1 or more and represents the number of channels of the reproduced signal. In the present example, the description is being made using the conversation between the seats in the first and third rows, but the conversation may be between seats in the first and second rows of an automobile with two rows of seats.

The frequency characteristics converting apparatus 100 is, for example, a special apparatus configured by reading a special program into a known or dedicated computer having a central processing unit (CPU), main storage (random-access memory (RAM)), and the like. The frequency characteristics converting apparatus 100 executes each piece of processing under the control of the central processing unit, for example. Data input to the frequency characteristics converting apparatus 100 and data obtained by each piece of processing are stored into the main storage, for example, and each piece of data stored in the main storage is read out to the central processing unit as needed and used for other processing. At least one or some of the processing units of the frequency characteristics converting apparatus 100 may be configured using hardware such as an integrated circuit. Each storage unit provided in the frequency characteristics converting apparatus 100 can be configured using, for example, main storage such as a random-access memory (RAM) or middleware such as a relational database or a key value store. However, each storage unit is not necessarily required to be provided inside the frequency characteristics converting apparatus 100 and may be configured using auxiliary storage formed of a semiconductor memory element, such as a hard disk, an optical disc, or a flash memory, and provided outside the frequency characteristics converting apparatus 100.

Hereinafter, each unit will be described.

<Noise Level Estimation Unit 110>

The noise level estimation unit 110 receives the collected-sound signal $X_F$ as an input, estimates a noise level at a first position inside the vehicle (S110), and outputs an estimated value $N_F$. In the present embodiment, the first position is a hearing position with respect to the speaker 92F. In other words, the noise level estimation unit 110 estimates the noise level at the hearing position from the collected-sound signal $X_F$ observed by the microphone 91F located as close as possible to the hearing position. For example, in the case of a bidirectional communication system, each of the microphones 91F, 91R installed to collect the voice of a hearing person can be used as the microphone mentioned above.

Any method may be used for calculating the noise level. For example, the noise level can be obtained by an average value of signal power for a long time or a dip-hold value. Hereinafter, in order to clearly indicate that the processing is performed for each frequency and for each frame, the collected-sound signal $X_F$ and the estimated value $N_F$ of the noise level are expressed as $X_F(\omega,t)$ and $N_F(\omega,t)$, respectively. Note that $\omega$ represents a frequency, and $t$ represents a frame number.

The noise level estimation unit 110 obtains the magnitude of the collected-sound signal $X_F(\omega,t)$. The magnitude is, for example, an absolute value $|X_F(\omega,t)|$ of the collected-sound signal $X_F(\omega,t)$, a power $|X_F(\omega,t)|^2$ thereof, or the like. Hereinafter, the absolute value $|X_F(\omega,t)|$ and the power $|X_F(\omega,t)|^2$ are denoted as a level $P_F(\omega,t)$. Dip-hold processing of holding the minimum value of the calculated level $P_F(\omega,t)$ is performed to obtain steady noise power.

This can be realized by, for example, performing averaging processing with a long time constant when the level rises, and performing the average processing with a short time constant when the level drops.

$$N_F((\omega,t)=\beta N_F((\omega,t-1)+(1-\beta)P_F(\omega,t)P_F((\omega,t)> N_F((\omega,t-1)$$

$$N_F(\omega,t)=\gamma N_F(\omega,t-1)+(1-\gamma)P_F(\omega,t)P_F(\omega,t)\leq N_F((\omega,t-1).$$

$\gamma>\beta$ and each has a value of 0 to 1.

Further, an estimated value $N_F(t)$ of the noise level of the entire frequency component is obtained by adding the estimated value $N_F(\omega,t)$ of the noise level for each frequency to the frequency $\omega$ by the following expression:

$$N_F(t)=\Sigma_\omega N_F(\omega,t) \qquad [\text{Math. 1}]$$

The addition may be performed after the estimated value $N_F(\omega,t)$ is multiplied by a preset weight $W_F(\omega)$ for each frequency. In this case, the following expression is obtained:

$$N_F(t)=\Sigma_\omega W_F(\omega)N_F(\omega,t) \qquad [\text{Math. 2}]$$

Hereinafter, the frame number t is omitted since similar processing is performed for each frame.

<Change Setting Database Unit 120>

The change setting database unit 120 holds N preset change settings. N is any integer equal to or larger than 2. The change setting is formed of a combination of a threshold value and a frequency characteristic. The frequency characteristic represents a relationship between a frequency and a gain. Alternatively, the coefficient of the FIR filter or the IIR filter having the desired frequency characteristic is held.

Figure 4:
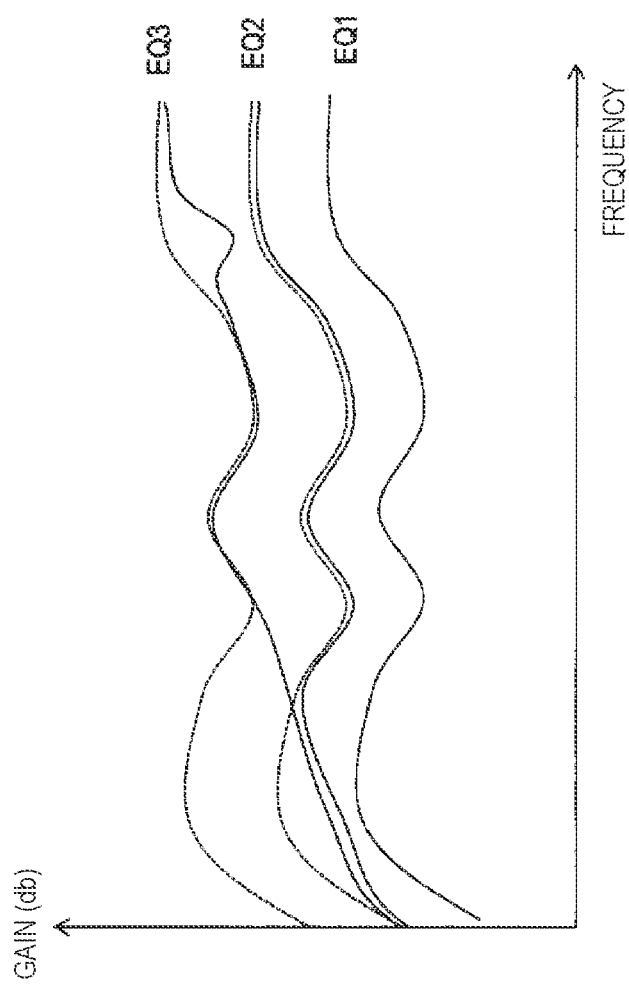
FIG. 4 is a diagram showing examples of a frequency characteristic of a change setting.

FIG. 4 shows examples of a frequency characteristic of a change setting. For example, a gain of a change setting EQ1 for a low noise level is set such that the total frequency characteristic of the microphone 91R and the speaker 92F is made flat (equalized) and that reproduced sound from the speaker 92F achieves a natural sound quality. Further, for example, a gain of a change setting EQN for a high noise level is set such that the sound volume can be increased without howling while the total frequency characteristic of the microphone 91R and the speaker 92F is made as flat as possible. A frequency characteristic in which the gain of the frequency characteristic of EQ1 is increased, indicated by a broken line in FIG. 4, is to be set in a case where the noise level is large, but howling will then occur, and hence EQ2 and EQ3 in which the gain of the frequency at which the howling occurs is decreased are each set as a change setting for a case where the noise level is large.

<Change Setting Selection Unit 130>

The change setting selection unit 130 receives the estimated value $N_F$ of the noise level as an input, selects one change setting out of the N change settings included in the change setting database unit 120 based on the magnitude relationship between the estimated value $N_F$ of the noise level and the N threshold values of the N change settings (S130), extracts a frequency characteristic or a filter coefficient corresponding to the selected change setting from the change setting database unit 120, and outputs the extracted frequency characteristic or filter coefficient to the changing unit 140. For example, when the estimated value $N_F$ increases in response to an increase in noise, the estimated value $N_F$ is compared with the threshold value, and one of the change settings stored in the change setting database unit 120 is selected. For example, when the estimated value $N_F$ is smaller than a threshold value TH1, the change setting EQ1 is selected; when the estimated value $N_F$ is equal to or larger than the threshold value TH1 and smaller than a threshold value TH2, the change setting EQ2 is selected; when the estimated value $N_F$ is equal to or larger than a threshold value TH(n−1) and smaller than the threshold value THn, a change setting EQn is selected; and when the estimated value $N_F$ is equal to or larger than a threshold value TH(N−1), the change setting EQN is selected.

<Changing Unit 140>

The changing unit 140 receives, as inputs, the collected-sound signal $X_R$ collected by the microphone 91R and a frequency characteristic or a filter coefficient corresponding to the change setting selected by the change setting selection unit 130, changes the frequency characteristic of the collected-sound signal $X_R$ based on the frequency characteristic corresponding to the change setting (S140), and outputs a signal after the change. In this example, the gain for each frequency of the frequency characteristic corresponding to the change setting is multiplied by the collected-sound signal $X_R$ for each frequency to change the frequency characteristic of the collected-sound signal $X_R$. Note that the position where the microphone 91R is installed is also referred to as a second position. An input signal in the time domain may be filtered by an FIR filter or an IIR filter in which a filter coefficient corresponding to the change setting is set, and a time domain signal may be outputted.

With the above configuration, as the magnitude of noise at the hearing position to the speaker 92F increases, the frequency characteristics converting apparatus 100 increases the volume of target sound, collected by the microphone 91R, at the time of emission of the target sound by the speaker 92F and increases the degree of signal processing that is applied to the target sound. In the present embodiment, the signal processing applied to the target sound is processing of reducing the gain of the frequency causing howling and is a howling prevention processing. In EQ1 of FIG. 4 (when it is determined that the estimated value $N_F$ of the noise level belongs to a range in which the noise level is the smallest (e.g., when the noise level is smaller than the threshold value TH1)), only processing of equalizing the frequency characteristics of the microphone 91R and the speaker 92F is performed, and the howling prevention processing is not performed. In EQ2 of FIG. 4, in addition to the processing of equalizing the frequency characteristics, the howling prevention processing is performed in a low frequency band. In EQ3, a gain reduction width is increased, while the band for performing the howling prevention processing is further increased, to enhance the howling prevention processing.

<Effects>

With the above configuration, it is possible to realize the natural reproduced sound of the speaker while preventing howling. According to the present embodiment, the change setting can be changed in accordance with the noise level at the hearing position corresponding to the speaker 92F, and the sound quality can be given priority over the sound volume when the noise is small, and the sound volume can be given priority over the sound quality when the noise is large.

<Modifications>

In addition to the processing of changing the frequency characteristic, other processing, such as noise reduction processing or echo cancellation processing, may be performed between the microphone and the speaker.

As the signal processing to be applied to the target sound, instead of the howling prevention processing or together with the howling prevention processing, the noise reduction processing, the echo cancellation processing, or the like may be performed. In this case as well, in response to an increase in the magnitude of noise, the degree of the signal processing (howling prevention, noise reduction, echo cancellation), which is applied to the target sound, is increased.

In the present embodiment, the target sound is collected by the microphone 91R installed in the same vehicle as the speaker 92F, but the target sound may be sound collected outside the vehicle where the speaker 92F is installed and transmitted through an in-vehicle call or the like.

Second Embodiment

A description will be given focusing on portions different from the first embodiment.

Figure 5:
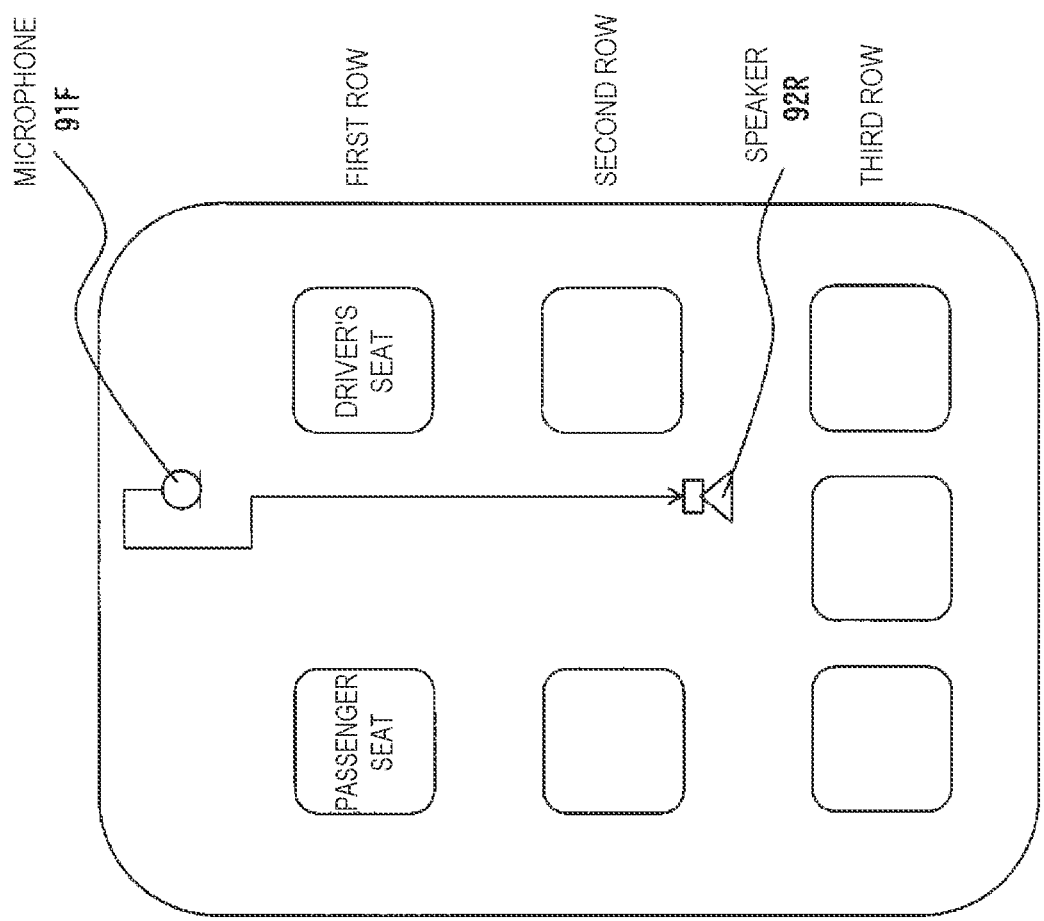
FIG. 5 is a diagram for explaining a vehicle mounted with a frequency characteristics converting apparatus according to a second embodiment.

When there is a microphone only in the first row, and there is no microphone near the hearing position (cf. FIG. 5), such as when voice is amplified only in the third row, the noise level of the microphone for transmission is used as the noise level for selecting a change. Since the space in the automobile is narrow, when noise in the first row is large, noise in the third row is assumed to be also large.

Figure 6:
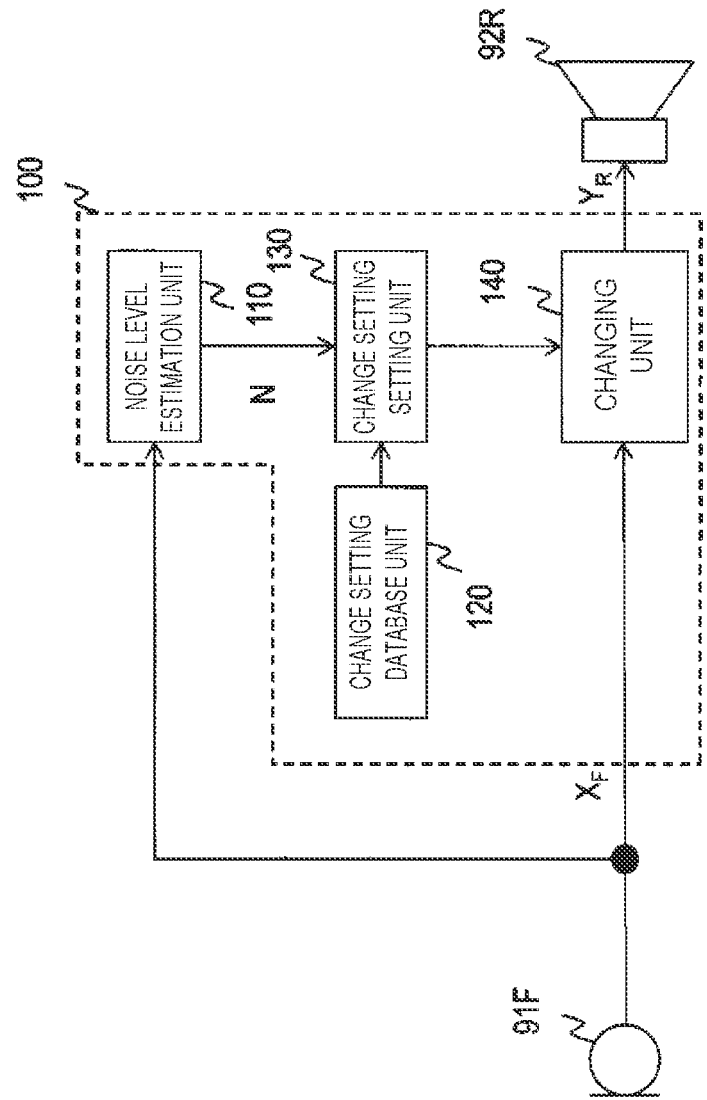
FIG. 6 is a functional block diagram of the frequency characteristics converting apparatus according to the second embodiment.

FIG. 6 shows a functional block diagram of the frequency characteristics converting apparatus 100 according to the second embodiment. The processing flow is similar to that in the first embodiment.

<Noise Level Estimation Unit 110>

The noise level estimation unit 110 receives the collected-sound signal $X_F$ as an input, estimates a noise level inside the vehicle (S110), and outputs an estimated value N.

<Change Setting Selection Unit 130>

The change setting selection unit 130 selects a change setting by using the estimated value N instead of the estimated value $N_R$.

In the present embodiment, the position where the microphone 91F is installed is also referred to as a second position. As the magnitude of noise at the second position increases, the frequency characteristics converting apparatus 100 increases the volume of target sound, collected by the microphone 91F, at the time of emission of the target sound by the speaker 92R and increases the degree of signal processing that is applied to the target sound.

<Effects>

With such a configuration formed, similar effects to those of the first embodiment can be obtained.

In the present embodiment, the target sound is collected by the microphone 91R installed in the same vehicle as the speaker 92R, but the target sound may be sound collected outside the vehicle where the speaker 92F is installed and transmitted through an in-vehicle call or the like. However, it is necessary to provide a microphone for noise-level estimation in the vehicle. The position where the microphone is installed is also referred to as a third position. In the present embodiment, the microphone that collects the target sound and the microphone for noise-level estimation coincide with each other, and the second position and the third position coincide with each other.

Third Embodiment

A description will be given focusing on portions different from the first embodiment.

In addition to the noise level, the magnitude of reproduced sound (hereinafter also referred to as reproduction level) of on-vehicle audio is also used to set a change. The sound of music or radio reproduced in the vehicle also makes it difficult to hear voice in the conversation, and hence a change setting for a higher noise level is used for a larger reproduction level of the audio.

Figure 7:
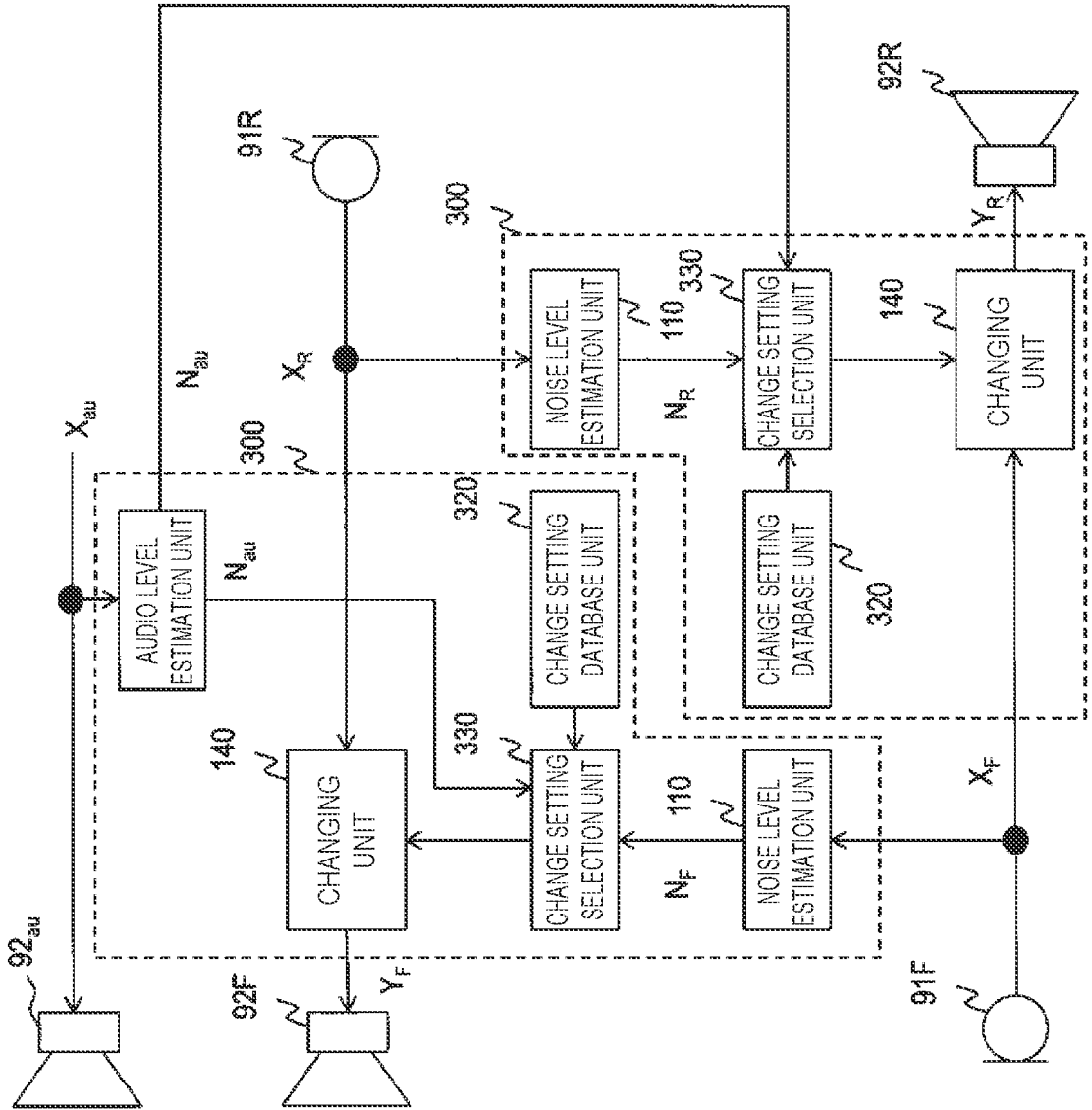
FIG. 7 is a functional block diagram of a frequency characteristics converting apparatus according to a third embodiment.
Figure 8:
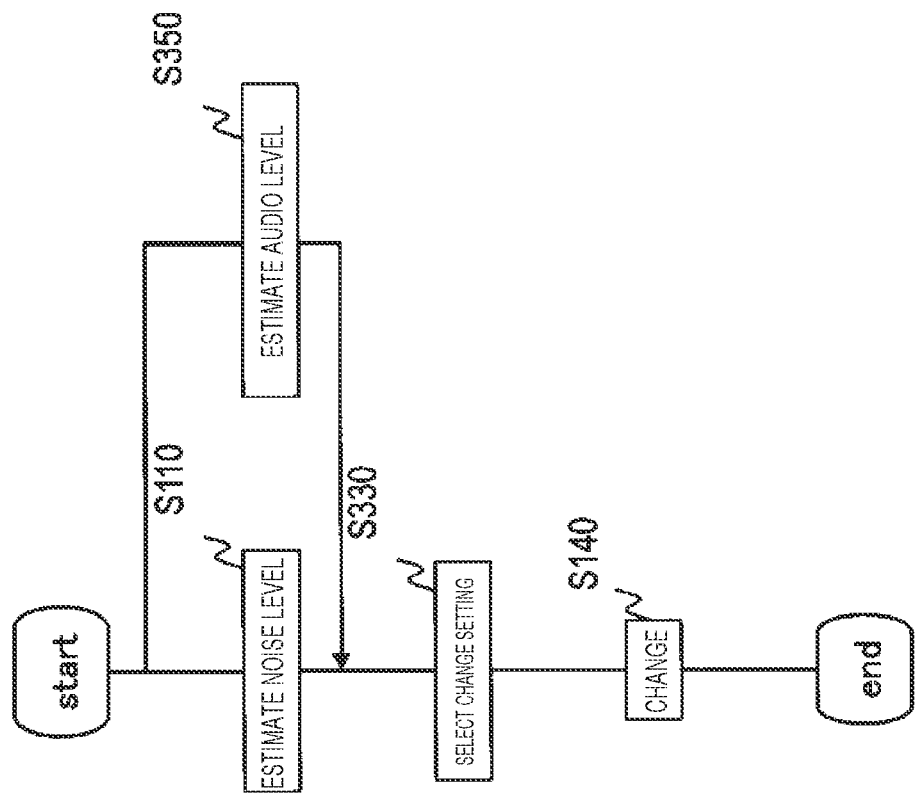
FIG. 8 is a diagram showing an example of a processing flow of the frequency characteristics converting apparatus according to the third embodiment.

FIG. 7 is a functional block diagram of a frequency characteristics converting apparatus 300 according to a third embodiment, and FIG. 8 is a processing flow thereof.

The frequency characteristics converting apparatus 300 includes the noise level estimation unit 110, the change setting database unit 120, an audio level estimation unit 350, a change setting selection unit 330, and the changing unit 140.

The frequency characteristics converting apparatus 300 receives the collected-sound signals $X_F$, $X_R$ collected by the microphones 91F, 91R and an audio signal $X_{au}$ as inputs, changes the frequency characteristic of the collected-sound signal $X_R$, and outputs a signal (reproduced signal) $Y_F$ after the change to the speaker 92F. The frequency characteristics converting apparatus 300 may receive the collected-sound signals $X_F$, $X_R$ collected by the microphones 91F, 91R, and the audio signal $X_{au}$ as inputs, change the frequency characteristic of the collected-sound signal $X_F$, and output a signal (reproduced signal) $Y_R$ after the change to the speaker 92R. Since the processing itself is the same except that the input/output of each unit is different, a configuration for changing the frequency characteristic of the collected-sound signal $X_R$ will be described in the present embodiment.

In the present embodiment, a vehicle mounted with the frequency characteristics converting apparatus 100 includes a speaker $92_{au}$ that reproduces an audio signal. The present embodiment is similar to the first embodiment in including the microphones 91F, 91R and the speakers 92F, 92R. In the present embodiment, the audio signal $X_{au}$ is reproduced by the speaker $92_{au}$, but the audio signal $X_{au}$ may be reproduced by the speaker 92F or the speaker 92R. For example, an addition unit is provided at the front stage of the speaker 92F or the speaker 92R, the audio signal $X_{au}$ and the output of the changing unit 140 are added in the addition unit, and a signal after the addition is output to the speaker 92F or the speaker 92R.

Specific processing content is as follows:

<Audio Level Estimation Unit 350>

The audio level estimation unit 350 receives the audio signal $X_{au}$ as an input, estimates the reproduction level of the audio in the vehicle (S350), and outputs an estimated value $N_{au}$. Any method may be used as a method for calculating the reproduction level. For example, the audio level estimation unit 350 may obtain the estimated value $N_{au}$ of the reproduction level of the audio by calculating a long-time average level of the audio signal $X_{au}$ or may obtain the estimated value $N_{au}$ by a similar method to the noise level estimation unit 110.

<Change Setting Database Unit 320>

The change setting database unit 320 holds N preset change settings. The change setting is formed of a combination of a noise-level threshold value, a reproduction-level threshold value, and a frequency characteristic.

<Change Setting Selection Unit 330>

The change setting selection unit 330 receives the estimated value $N_F$ of the noise level and the estimated value $N_{au}$ of the audio reproduction level as inputs and selects one change setting out of the N change settings included in the change setting database unit 120 based on the magnitude relationship between the estimated value $N_F$ of the noise level and N noise-level threshold values of the N change settings. This processing is similar to S130 in the first embodiment.

Further, the change setting selection unit 330 selects one change setting out of the N change settings included in the change setting database unit 120 based on the magnitude relationship between the estimated value $N_{au}$ of the reproduction level and the N audio-level threshold values of the N change settings (S330). For example, when the estimated value $N_{au}$ increases in response to an increase in reproduced sound, the estimated value $N_{au}$ is compared with the threshold value, and one of the change settings stored in the change setting database unit 320 is selected. For example, when the estimated value $N_{au}$ is smaller than a threshold value THO1, the change setting EQ1 is selected; when the estimated value $N_{au}$ is equal to or larger than the threshold value THO1 and smaller than a threshold value THO2, the change setting EQ2 is selected; when the estimated value $N_{au}$ is equal to or larger than a threshold value THO(n−1) and smaller than the threshold value THOn, the change setting EQn is selected; and when the estimated value $N_{au}$ is equal to or larger than a threshold value THO(N−1), the change setting EQN is selected.

Out of the change setting selected based on the estimated value $N_F$ of the noise level and the change setting selected based on the estimated value $N_{au}$ of the reproduction level, the change setting selection unit 330 selects a change setting for a higher noise level or a higher reproduction level, extracts a frequency characteristic corresponding to the selected change setting from the change setting database unit 320, and outputs the frequency characteristic to the changing unit 140.

With such a configuration, as the magnitude of the second target sound emitted from the speaker $92_{au}$ increases, the frequency characteristics converting apparatus 300 can increase the volume of the target sound when the target sound is emitted by the speaker 92F.

<Effects>

With such a configuration formed, similar effects to those of the first embodiment can be obtained. Further, according to the present embodiment, the change setting can be changed in accordance with both the noise level and the audio level.

<Other Modifications>

The present invention is not limited to the above embodiments and modifications. For example, the various processing described above may be executed not only in time series in accordance with the description but also in parallel or individually depending on the processing capability of the apparatus for executing the processing or as required. In addition, it is possible to make appropriate changes within the scope of the present invention.

<Program and Recording Medium>

Various processing functions in the apparatuses described in the above embodiments and modifications may be realized by a computer. In this case, the processing content of the functions that each apparatus needs to have is described by a program. By executing the program on the computer, various processing functions in the apparatuses are realized on the computer.

The program describing the processing content can be recorded on a computer-readable recording medium. The computer-readable recording medium may be any recording medium such as a magnetic recording device, an optical disc, a magneto-optical recording medium, or a semiconductor memory.

The program is distributed by, for example, selling, transferring, or lending a portable recording medium, such as a DVD or a CD-ROM in which the program is recorded. Further, the program may be distributed by previously storing the program into storage of a server computer and transferring the program from the server computer to another computer via the network.

The computer executing such a program, for example, first stores into its own storage unit a program recorded on a portable recording medium or a program transferred from the server computer. Then, at the time of executing processing, the computer reads the program stored in its own storage unit and executes processing in accordance with the read program. As another embodiment of the program, the computer may read the program directly from the portable recording medium and execute processing in accordance with the program. Further, each time a program is transferred from the server computer to the computer, processing in accordance with the received program may be executed sequentially. The processing described above may be executed by a so-called application service provider (ASP)-type service that realizes a processing function only by instruction of the execution and acquisition of the result without transferring the program from the server computer to the computer. Note that the program includes information that is used for processing by an electronic computer and is equivalent to a program (such as data that is not a direct command to a computer but has the nature to regulate the processing of the computer).

Although each apparatus has been configured by executing a predetermined program on the computer, at least a part of the processing content may be realized by hardware.

The invention claimed is:

1. A frequency characteristics converting apparatus comprising processing circuitry configured to, in response to an increase in magnitude of noise at a first position in a vehicle, increase volume of a target sound in emitting the target sound by a sound emitter and increase a degree of a signal processing applied to the target sound, the sound emitter being located at the first position, the target sound being collected by a sound collector installed at a second position, wherein the signal processing includes concurrent processing of preventing howling of the target sound and equalizing frequency characteristics of the target sound from the sound collector and to the sound emitter.

2. A frequency characteristics converting apparatus comprising processing circuitry configured to, in response to an increase in magnitude of noise at a third position in a vehicle, increase volume of a target sound in emitting the target sound by a sound emitter and increase a degree of a signal processing applied to the target sound, the sound emitter being located at a first position in the vehicle, the target sound being collected by a sound collector installed at a second position, the first position and the third position being different positions, wherein the signal processing includes concurrent processing of preventing howling of the target sound and equalizing frequency characteristics of the target sound from the sound collector and to the sound emitter.

3. The frequency characteristics converting apparatus according to claim 1 or 2, wherein, when the magnitude of the noise is equal to or smaller than a predetermined threshold value, the processing circuitry is further configured to equalize frequency characteristics of the sound collector and the sound emitter.

4. The frequency characteristics converting apparatus according to claim 1 or 2, wherein in response to an increase in magnitude of a second target sound emitted by a sound emitter in the vehicle, the processing circuitry increases volume of the target sound in emitting the target sound and increases a degree of signal processing that is applied to the target sound.

5. A frequency characteristics converting apparatus comprising:
processing circuitry and memory, wherein
the memory holds N change settings each formed of a combination of a threshold value and a frequency characteristic representing a relationship between a frequency and a gain, N being any integer of 2 or more, and
the processing circuitry is configured to:
estimate magnitude of noise at a first position on an inside of a vehicle;
select one change setting out of the N change settings based on a magnitude relationship between an estimated value of the magnitude of the noise and the threshold value; and
change a frequency characteristic of a collected-sound signal, collected by a sound collector installed at a second position, based on a frequency characteristic corresponding to the selected change setting.

6. A frequency characteristics converting method, implemented by a frequency characteristics converting apparatus that includes processing circuitry, the method comprising the processing circuitry, in response to an increase in magnitude of noise at a first position in a vehicle, increasing volume of a target sound in emitting the target sound by a sound emitter and increasing a degree of a signal processing applied to the target sound, the sound emitter being located at the first position, the target sound being collected by a sound collector installed at a second position, wherein the signal processing includes concurrent processing of preventing howling of the target sound and equalizing frequency characteristics of the target sound from the sound collector and to the sound emitter.

7. A frequency characteristics converting method, implemented by a frequency characteristics converting apparatus that includes processing circuitry, the method comprising the processing circuitry, in response to an increase in magnitude of noise at a third position in a vehicle, increasing volume of a target sound in emitting the target sound by a sound emitter and increasing a degree of a signal processing applied to the target sound, the sound emitter being located at a first position in the vehicle, the target sound being collected by a sound collector installed at a second position, the first position and the third position being different positions, wherein the signal processing includes concurrent processing of preventing howling of the target sound and equalizing frequency characteristics of the target sound from the sound collector and to the sound emitter.

8. A non-transitory computer-readable recording medium having stored thereon a program for causing a computer to function as the frequency characteristics converting apparatus according to claim 1 or 2.

* * * * *